June 25, 1957     J. H. CRANKSHAW     2,796,750
SPACER COUPLING
Filed Jan. 10, 1955
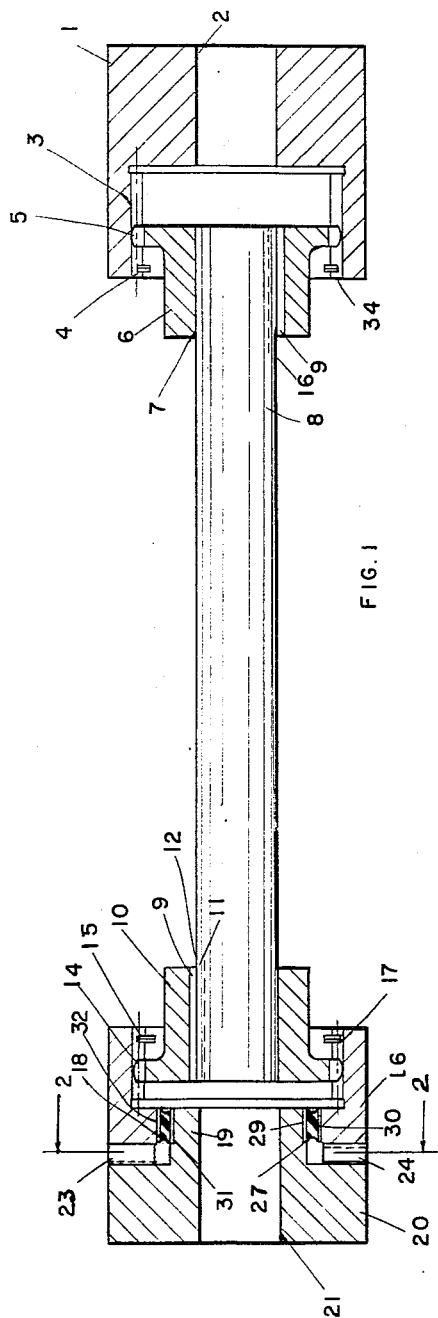
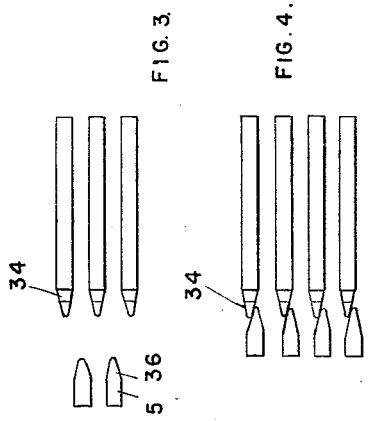
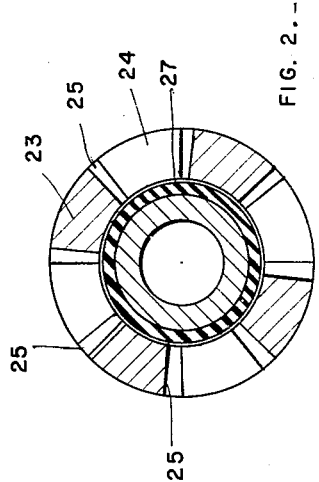
*INVENTOR.*
JOHN H. CRANKSHAW
BY
Charles L. Lorencheck
atty

United States Patent Office 2,796,750
Patented June 25, 1957

2,796,750

SPACER COUPLING

John H. Crankshaw, Erie, Pa., assignor to American Flexible Coupling Company, Erie, Pa., a corporation of Pennsylvania Application January 10, 1955, Serial No. 480,706

7 Claims. (Cl. 64—8)

This invention relates to couplings and more particularly to couplings for connecting a driving member to a driven member, particularly where the driven member is a heavy roll used in a steel mill.

The output shaft of a driving unit for operating a steel mill roll is frequently out of alignment with the roll. Therefore, it becomes necessary to connect the driving member to the roll by some universal coupling means. One of the most satisfactory devices for coupling a driving means to a steel mill roll has been a gear type coupling. In the use of these gear type couplings, difficulty has frequently been experienced in connecting up the coupling to the roll. When they have been uncoupled for repair or replacement, it has been found that the rolls are frequently very heavy, often weighing more than one ton. Consequently, when the drive unit is to be connected to the roll through the coupling and the teeth on one part of the coupling are not perfectly aligned with the teeth on the other part, it is difficult to get the teeth to mesh since the roll has such great inertia and the drive is often fairly immovable. Therefore, neither will readily turn relative to the other and there will be interference between the teeth. It has often occurred that the mechanic connecting the coupling will force or drive the two mating parts of the coupling together with a hammer, thereby injuring the teeth. I propose to overcome the above difficulties in couplings by providing a resilient connection between two parts of the coupling which will be deflected to allow a portion of the coupling to rotate relative to another portion a limited amount, thereby bringing the ends of the teeth into alignment. I also propose to taper the ends of the teeth so that they will be readily engagable.

More specifically, it is an object of this invention to provide a coupling which is simple in construction, economical to manufacture, and which will allow the various parts of the coupling to be rotated relative to each other during the coupling procedure, thereby rendering the coupling simple to use.

Another object of this invention is to provide a coupling wherein a certain amount of backlash is provided between two relatively rotatable portions of the coupling whereby one portion of the coupling can be rotated a slight amount relative to the other while, at the same time, it will be urged to a neutral position by a resilient member disposed therebetween.

Another object of the invention is to provide a coupling member having backlash between two parts thereof and having a resilient member absorbing said backlash under light loads.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a longitudinal cross sectional view of the coupling member according to this invention;

Fig. 2 is a cross sectional view taken on line 2—2 of Fig. 1;

Fig. 3 is a top view of the teeth of two coupling members showing the tapered ends thereof; and Fig. 4 is another view of the teeth shown in Fig. 3.

Now with more specific reference to the drawing, a coupling member 1 is shown having a bore 2 therethrough adapted to attach to the end of a steel mill roll. The coupling member 1 has a counterbored portion 3 having internal teeth 4 therein. The internal teeth 4 are adapted to be engaged by the external teeth 5 formed on the outer periphery of the coupling member 6. The external teeth 5 are generally inolute shaped with their flanks crowned; that is, they are rounded, the teeth being thicker at the center than at the ends thereof. The coupling member 6 has a bore 7 therethrough adapted to receive a shaft 8. The arm of the shaft 8 is received in a bore 9 in the coupling member 10 and is keyed thereto by means of the key 11 received in the keyway 12. The coupling member 10 has external teeth 14 thereon which are adapted to engage the internal teeth 15 on the coupling member 16 and are disposed in the counterbore 17 therein. The coupling member 16 has a bore 18 which receives the reduced size portion 19 on the coupling member 20 and the coupling member 20 has a bore 21 therein which is suitable for attaching to a driving machine for a steel mill roll.

The coupling member 20 has the peripherally spaced lug members 23 disposed on the end thereof which interfit with lugs 24 on the end of the coupling member 16. It will be noted that there is a certain amount of backlash or clearance between the lugs 23 and the lugs 24 and, for this reason, the coupling member 16 can rotate a limited amount relative to the coupling member 20.

A resilient hollow cylindrical washer 27 restrains the lugs 23 and 24 of the coupling members 20 and 16 to a neutral position relative to each other so that the lugs 23 are disposed midway between the lugs 24 with a clearance 25 on either side thereof. The resilient hollow cylindrical member 27 made of rubber or similar resilient material is disposed between the coupling member 16 and the coupling member 20 and is bonded to each by means of the bond 29 which is attached to the member 19 at 31 and by means of the bond 32 which is attached to the inside bore 18 of the coupling member 16. Therefore, any relative movement between the coupling member 16 and the coupling member 20 will result in a deflection of the resilient member 27 and the resulting tendency of the resilient member 27 to restore the two sections 16 and 20 of the coupling to their no-load or neutral position shown in Fig. 2.

The ends 34 of the internal teeth 4 are wedge shaped as best shown in Figs. 3 and 4. Likewise, the external teeth 5 are wedge shaped as shown at 36. Therefore, when the ends 36 of the external teeth 5 are brought into engagement with the ends 34 of the internal teeth 4, two sets of teeth can be slid past each other to cause the coupling to engage. If a rigid driving mechanism were connected between the shaft 8 and the coupling member 20 and a heavy roll were attached to the coupling member 1, considerable stress would be exerted on the ends of the teeth 4 and 5; however, since the resilient member 27 will be deflected by a relatively low force when the external teeth 5 of the coupling member 6 are applied to the ends 34 of the coupling member 10 and the force exerted thereon tends to cause the ends 36 to slide past the ends 34 of the teeth, the resilient member 27 will be deflected, thereby allowing the shaft 8 to rotate relative to the coupling member 20 and allowing the teeth to slide past each other to engage witout exerting any unduly heavy forces on any part of the coupling. Then, when the driving mechanism attached to the coupling member 20 is started, the resilient member 27 will be stressed so that the lugs 23 engage the lugs 24 at one side thereof, thereby transmitting a positive force between the coupling member 20 and the coupling member 1.

It will be noted that if there is an appreciable backlash between the teeth of the coupling, resilient member 27 will tend to hold the teeth into engagement on one side thereof so that any tendency for the coupling to chatter during starting or stopping or when the coupling is carrying light loads will be eliminated.

When it is desired to reconnect the coupling when the part 6 has been separated from the part 1, the ends 36 of the teeth 5 are brought into engagement with the ends 34 of the teeth 4 and the coupling member 6 is forced toward the coupling member 1. Then, if the driving mechanism will not allow the coupling member 20 to rotate, the shaft 8 will be rotated by the force of the sliding edges of the teeth in engagement with each other, thereby setting up an internal stress in the resilient member 27 and allowing the shaft 8 to rotate slightly relative to the coupling member 20, thereby allowing a coupling to be engaged without injury to the teeth.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising a driving member and a driven member disposed in spaced relation to each other and connected to each other by means of a block of resilient material, a lug on one said member extending therefrom and disposed in spaced relation between two lugs on said other member, said resilient material urging said lugs to remain in spaced relation to each other, said lug on one said member being adapted to engage said lugs on said other member when a load is transmitted therebetween, one said member being attached to a shaft, an external gear having the ends of its teeth tapered being attached to said shaft, and an internal gear having the ends of its teeth tapered, said internal gear being adapted to be attached to a load, said tapered teeth being adapted to slide past each other whereby said resilient member may be deflected, allowing said external and said internal teeth to mesh.

2. The coupling recited in claim 1 wherein the teeth of said external gear are crowned flank teeth.

3. A coupling comprising a first coupling member having a reduced size portion extending from one end thereof, an enlarged flange portion attached to said reduced size portion, a second coupling member having a bore therethrough, said reduced size portion extending through said bore and spaced from the inner periphery thereof, a resilient sleeve attached to the outside of said reduced size portion and to the inside of said bore, spaced axially extending lugs on said flange member, and spaced outwardly extending lugs on said second member interfitting with the lugs on said other member, said resilient sleeve urging said coupling lugs on one member to a neutral spaced relation to the lugs on said other member.

4. The coupling recited in claim 3 wherein said lugs are disposed on the ends of said coupling members.

5. The coupling recited in claim 3 wherein said bore in said second coupling member is counterbored, and internal teeth are formed in said second coupling member and extend into said counterbore, said teeth being axially spaced from said resilient sleeve, an external gear having external teeth thereon extending into said counterbore and engaging said internal teeth on said second coupling member.

6. The coupling recited in claim 5 wherein the ends of said external gear teeth adjacent said resilient sleeve are wedge shaped and the ends of said internal teeth remotest from said resilient sleeve are also wedge shaped whereby said wedge shaped ends of said internal teeth and said wedge shaped ends of said external teeth slide past each other when said external gear is inserted into said internal gear.

7. The coupling recited in claim 5 wherein the teeth of said external gear are crowned flank teeth.

References Cited in the file of this patent

UNITED STATES PATENTS

| 2,394,405 | Schjolin | Feb. 5, 1946 |
| 2,742,769 | Gleeson et al. | Apr. 24, 1956 |

FOREIGN PATENTS

| 532,393 | Great Britain | Jan. 23, 1941 |